F. M. BAKER.
HARVESTER REEL.
APPLICATION FILED JUNE 9, 1913.
1,085,076.
Patented Jan. 20, 1914.
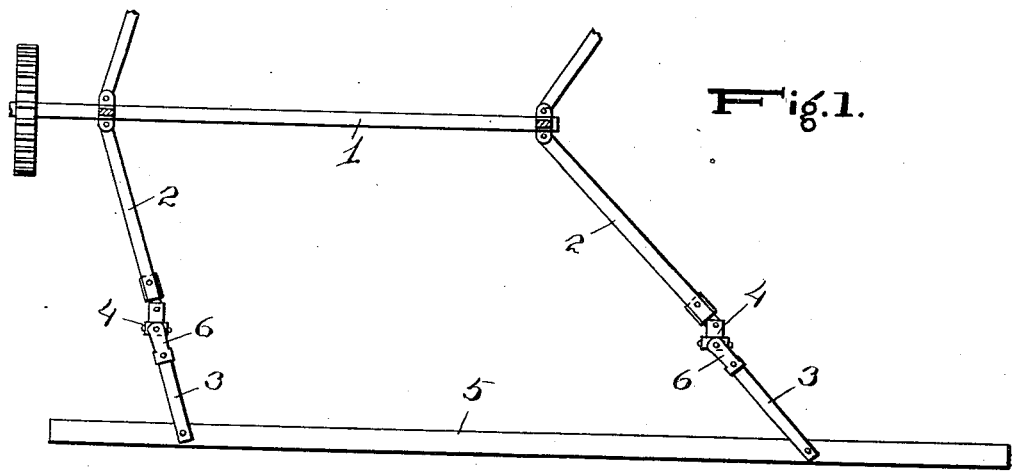
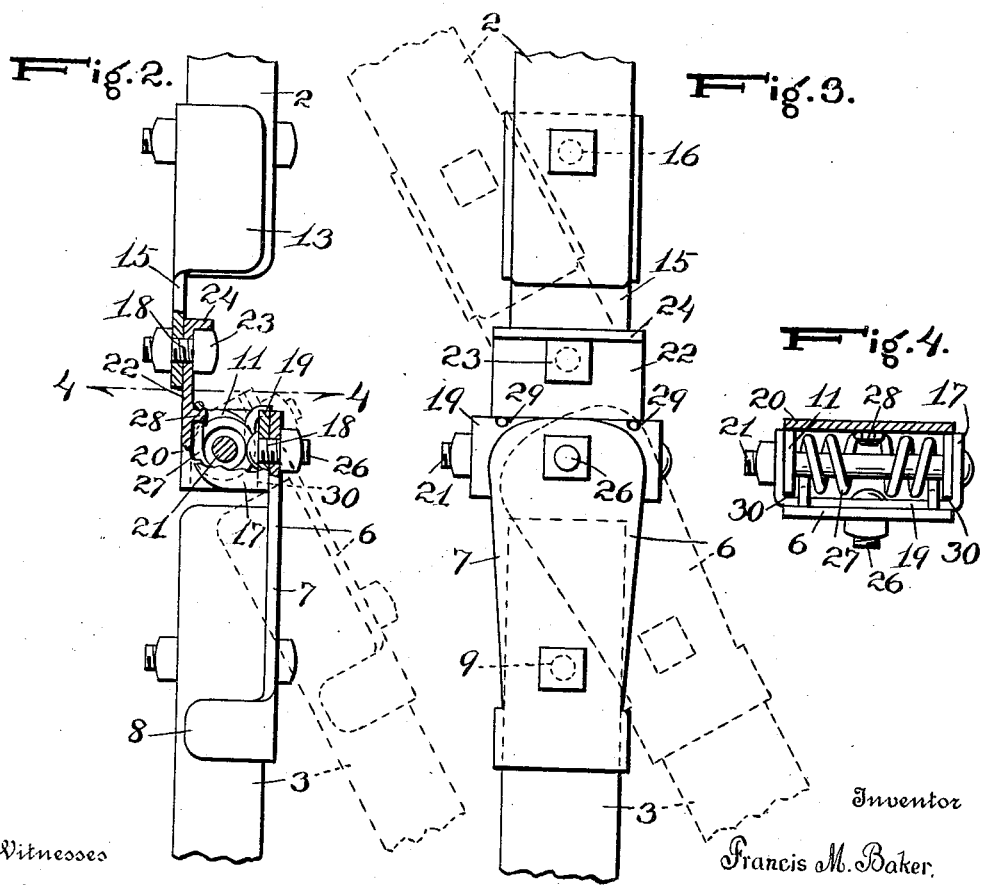
Witnesses
Stuart Hilder.
Frances W. Anderson.
Inventor
Francis M. Baker.
By
E. W. Anderson & Son
Attorneys

UNITED STATES PATENT OFFICE.

FRANCIS M. BAKER, OF VIROQUA, WISCONSIN.

HARVESTER-REEL.

1,085,076.  Specification of Letters Patent.  Patented Jan. 20, 1914.

Application filed June 9, 1913. Serial No. 772,715.

*To all whom it may concern:*

Be it known that I, FRANCIS M. BAKER, a citizen of the United States, resident of Viroqua, in the county of Vernon and State of Wisconsin, have made a certain new and useful Invention in Harvester-Reels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of a harvester reel, partly broken away, showing my invention as applied. Fig. 2 is an end view of a harvester reel, bat partly broken away having my invention applied thereto, parts being in section. Fig. 3 is a side view of the same, the adjusted portion of the parts being shown in dotted lines. Fig. 4 is a section on the line 4—4 Fig. 2.

The object of the invention is to provide an improvement in harvester reels, and it consists in the novel construction and combinations of parts, as hereinafter set forth.

The invention relates particularly to the hinge connection between the bat and the arm of the reel, and is an improvement upon the device described in Letters Patent No. 1,039,631, dated September 24, 1912.

In the accompanying drawings, illustrating the invention, the numeral 1, indicates the shaft of a harvester reel; 2, represents a wooden arm-section secured thereto, and 3, a wooden arm-section extending outward in the general direction of the arm-section 2, but connected to the latter by the spring hinge device 4. The reel bat 5, is attached to the outer end of the outer arm-section 3.

The arms of the reel being of wood must be of straight stock, and as most reels are provided with arms extending obliquely as well as normally between the shaft and bat, which are parallel, it is designed to provide a hinge connection which will satisfy the conditions, whether the straight arm-sections of a reel arm are in direct line with each other or vary therefrom as in an oblique reel arm more or less in parallel relation. To this end are provided four plates, two of which are outer attachment plates to be secured respectively to the inner and outer arm-sections, the other two plates being intermediate and pivoted together and respectively to the outer plates to complete the hinge connection.

The outer end plate 6, consists of an elongated flat portion 7, which is provided at one end with lateral flanges 8, between which is secured the end of the outer arm-section 3, this end being held and braced securely in the bearing plate 6, by the lateral flanges and by a bolt engaging the arm-section and the perforation 9, in said plate. The other end of the plate is provided with a perforation 18. The inner end plate or bearing plate 15, is of substantially similar construction, having lateral bearing flanges 13, to brace and hold the outer end of the inner arm section, and a bolt hole 16, for a securing bolt. This plate has its bearing portion parallel to the usually broader bearing portion 7, of the plate 6. Each of these plates has a bolt hole 18, for a pivot bolt whereby it is connected to the plate of the intermediate hinge portion.

The plates 19 and 20, constitute the body of the hinge portion, the plate 19, being of rectangular bracket form having holes through its arms 17, for a pivot bolt 21, whereby it is connected to the perforated arms 11, of the plate 20, which is also of bracket form, but has an extension 22, of its main portion. This extension 22, is perforated at 18, for the passage of a pivot bolt 23, whereby it is connected to the bearing portion of the plate 15, so that the faces of these pivotally connected portions have frictional engagement of more or less firmness in order to provide for angular adjustment, such adjustment being secured through the medium of the pivot bolt 23. The end of the extension 22, is provided with a flange 24, near its bolt hole at 18, to prevent motion of the bolt head, and consequent loosening of the bolt.

The plate 19, of the hinge connection, is provided with a bolt hole at 18, in its transverse bearing portion, for a pivot bolt 26, whereby it is connected to the plate 6, of the arm-section, in such wise that the faces of these plates have frictional engagement and are capable of angular adjustment. In this construction the hinge bolt 21, is transverse, or normal to a plane extending through the pivot bolts 23 and 26, it being designed that the angular adjustment of the arm-section plates can be effected without disturbing the transverse position of the hinge bolt 21, it being essential that this bolt shall be parallel to the reel bat. For similar reasons the hinge bolts of all reel arms, in connection with a reel bat, must be in axial line with each other, and the outer and inner arm-sections connecting the bat and shaft must be proportioned in length with this objective view, the proportions being governed by the obliquity of the arm, the length of both arm-sections of a reel arm being greater, as the reel arm is required to be longer.

A strong spring 27, around the hinge bolt, bears against the hinge plates in such wise as to hold them in parallel relation with sufficient tension for the stroke of the bats in the work of the reel. But this spring is designed to yield in case the bat strikes a stone or other obstruction, so as to enable the outer arms and bat to give way to the rear, and in this way avoid injury. Preferably this spring is connected by its middle portion to a boss 28 of the plate 20, its ends engaging notches 29 of the plate 19.

In order that the outer arm-section, as well as the inner arm-section of the reel arm, shall lie substantially in the plane of the hinge bolt 21, the lateral holding flanges of the plates 6 and 15, are turned inward or toward said plane.

The hinge plates abut at 30, the arms of each inner bracket engaging its corresponding bracket at the points indicated, so that the tension springs will keep the hinge plates extended, or parallel, and in case an obstruction should be engaged by the reel bat, will allow the outer hinge plates, which are connected to the outer arm-section plates, to turn on the pivot bolts, to allow the bat to yield until the obstruction is passed, when the springs will restore the outer arms and bat to normal position.

I claim:

1. In a harvester reel, radial reel arms comprising respectively outer and inner arm-sections, elongated flanged plates connected respectively by their outer ends to said inner and outer arm-sections bracket plates respectively pivoted to the inner ends of said flanged plates, said bracket plates having lateral arms engaging each other, a transverse pivot bolt engaging said arms, said transverse bolt extending in a plane parallel to the planes of the plates, a tension spring around said pivot bolt, and means for holding the spring to its work.

2. In a harvester reel, a shaft reel, bats parallel thereto, sectional wooden arms of different lengths attached respectively to the bats and shaft, flanged plates secured to the adjacent ends of the outer and inner arm sections, bracket plates pivoted to said flanged plates and having lateral arms engaging each other, transverse pivot bolts equidistant from the reel shaft extending through said lateral arms, tension springs around said pivot bolts, and means for holding the springs to their work.

3. A hinge device for sectional wooden arms of harvester reels, comprising two flanged-arm attachment-plates having pivot bearings at one end and bolt holes in the flanged portion, a bracket plate pivoted to one of said attachment plates, a bracket plate having an extension pivoted to the other attachment plate, a transverse pivot bolt extending through the bracket arms, a tension spring around said pivot bolt, and means for holding the spring to its work.

In testimony whereof I affix my signature in presence of two witnesses.

FRANCIS M. BAKER.

Witnesses:
 JOHN J. M. DAWSON,
 LUCY R. DAWSON.

---

Copies of this patent may be obtained for five cents each, by addressing the "Commissioner of Patents, Washington, D. C."